(12) United States Patent
Liu et al.

(10) Patent No.: US 8,381,607 B2
(45) Date of Patent: Feb. 26, 2013

(54) ROLLER SCREW

(75) Inventors: Jouns Liu, Taichung (TW); Wen-Chia Wu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 266 days.

(21) Appl. No.: 12/908,329

(22) Filed: Oct. 20, 2010

(65) Prior Publication Data

US 2012/0096967 A1    Apr. 26, 2012

(51) Int. Cl.
*F16H 1/24* (2006.01)
*F16H 55/02* (2006.01)
(52) U.S. Cl. .................. 74/424.82; 74/424.87
(58) Field of Classification Search ............... 74/424.82, 74/424.83, 424.86, 424.87, 424.88, 424.91; F16H 55/02, 1/24
See application file for complete search history.

(56) References Cited

U.S. PATENT DOCUMENTS

| 3,055,230 A * | 9/1962 | Strassberg ................. 74/424.82 |
| 3,192,791 A * | 7/1965 | Greby ........................ 74/424.82 |
| 7,870,806 B2 * | 1/2011 | Nishimura et al. ........ 74/424.82 |
| 2009/0070078 A1 * | 3/2009 | Miyahara et al. ................. 703/1 |
| 2010/0307271 A1 * | 12/2010 | Hsu et al. .................... 74/424.82 |

\* cited by examiner

*Primary Examiner* — Troy Chambers
*Assistant Examiner* — Jake Cook
(74) *Attorney, Agent, or Firm* — Muncy, Geissler, Olds & Lowe, PLLC

(57) ABSTRACT

A roller screw includes a long shaft, a screw nut sleeved onto the long shaft, and rollers, a turnaround member and a turnover member set in between the long shaft and the screw nut. The turnaround member enables the rollers to circulate. The turnover member defines a turnover passage extending over the peripheral surface of the long shaft and connected between two load paths in the long shaft and the screw nut to constitute a circulation path. The direction of arrangement of the rollers before entering the turnover passage is different from that after moving out of the turnover passage so that the amount ratio of the rollers that are arranged in two different directions is kept constant for industrial application.

6 Claims, 17 Drawing Sheets

ROLLER SCREW

BACKGROUND OF THE INVENTION

1. Field of the Invention

The present invention relates to a roller screw and more particularly, to such a roller screw that has different load carrying capacities at the left and right sides in the axial direction.

2. Description of the Related Art

In a precision machine, there may be a design for controlling displacement of the worktable or machining member. For high-load transmission, a roller screw may be used to achieve precision transmission so that the total volume of the machine, the manufacturing cost and the manufacturing time can be reduced. The contact between rollers and the threads of a screw and nut set is a linear contact (the contact between balls and the threads of a screw and nut set is a spot contact), the contact surface area of rollers is greater than the contact surface area of balls. The load carrying capacity is directly proportional to the contact surface area. Under a same load condition, the use of rollers as a transmission medium between the nut and the screw can greatly reduce the dimension of the roller screw (in other words, the dimension of a ball screw will be greater than the dimension of a roller screw of the same capacity), in consequence, the dimension of the facility can be relatively reduced. Further, many different types of roller screws are known. However, these conventional roller screws are practical for industrial application (due to the reasons: (a) the conventional roller screws commonly have a complicated structure and are not suitable for low-cost mass-production; (b) the performance of the conventional roller screws cannot satisfy user requirements). In a roller screw, at least one thread groove is defined between the screw and the nut for accommodating multiple rollers. Roller screw designs are known as follows:

A): A screw and a nut are arranged together and a thread groove is defined in each of the screw and the nut to accommodate multiple rollers in one same direction. This thread groove design enables the rollers to rotate in the same direction and angle, i.e., the rollers bear the load in the direction of rotation in the thread grooves during displacement of the nut. Thus, the arrangement of the rollers can simply bear the load in one direction. However, when a force is produced in the no-load direction, for example, when an axial force is produced, the rollers will slide axially relative to the thread grooves, causing friction damage and roller screw operation instability. Further, because no pre-stress can be set between the rollers and the screw/nut (because the rollers are arranged in the same direction and the outer diameter of the rollers is greater than the length of the rollers), a back lash (clearance) will be produced between the rollers and the thread grooves, lowering the positioning precision and causing vibration during operation. Therefore, a roller screw of this design is not suitable for use in a high-precision machine.

B): A screw and a nut are arranged together and a thread groove is defined in each of the screw and the nut to accommodate multiple rollers in a staggered manner. Arranging the rollers in a staggered manner can bear the load from two directions and kept the load in balance. However, because only one half of the rollers can bear the load in every direction (due to staggered arrangement), this design of roller screw has the drawbacks of low load carrying capacity and low rigidity. When increasing the load carrying capacity, the number of rollers must be relatively increased, in consequence, the length of the nut must be relatively increased.

C): A screw and two nuts are arranged together, a thread groove is defined in the screw and each of the nuts, and multiple rollers are arranged in parallel in the thread grooves. According to this design, the nuts are designed to guide rotation of the rollers at different tilting angles. This design enables the roller screw to bear the load in two different directions. Because this design of roller screw is a double-nut design, the total length of the nuts on the screw is relatively longer, shortening the stroke of the nuts on the screw. To overcome this problem, the total length of the screw must be relative increased. However, increasing the length of the screw relatively increases the manufacturing cost and the material cost. Further, the contact surfaces between the two nuts require high surface accuracy and high degree of parallelism. To achieve these requirements, an extra grinding process to grind the nuts is necessary. Further, this double-nut design complicates the installation process and requires much the installation time. Therefore, the manufacturing cost of a double-nut roller screw is high.

SUMMARY OF THE INVENTION

The present invention has been accomplished under the circumstances in view. It is the main object of the present invention to provide a roller screw, which is practical for mass production and allows adjustment of the load at the left and right sides in the axial direction subject to facility requirements to enhance applicability. For example, the roller screw is applicable a facility that requires different load carrying capacities at the left and right sides in an axial directions (such as all-electric injection molding machine, high-speed punch press, mold-clamping toggle mechanism, mold fixer, . . . etc.). Thus, the design of the present invention fits different industrial requirements.

To achieve this and other objects of the present invention, a roller screw comprises a plurality of rollers, a long shaft shaped like a long bar and a screw nut module. Each roller comprises a radial surface in a cylindrical shape. The long shaft comprises a cylindrical peripheral surface and a V-channel spirally extending around the cylindrical peripheral surface. The V-channel comprises two opposing sidewalls defining a first track face and a second track face and a 90° contained angle between the first track face and the second track face. The screw nut module comprises a turnover passage, a turnaround passage and an axial hole for the passing of the long shaft, an internal surface surrounding the axial hole and a V-groove spirally extending around the internal surface corresponding to the V-channel of the long shaft. The V-groove comprises two opposing sidewalls defining a first contact face and a second contact face and a 90° contained angle between the first contact face and the second contact face. The V-channel and the V-groove constitute a load path for accommodating the rollers. The turnover passage divides the load path into a first load path and a second load path. The first load path and the second load path each have one end thereof respectively connected to one end of the turnover passage, and an opposite end thereof respectively connected to two distal ends of the turnaround passage. The turnover passage extends over the cylindrical peripheral surface of the long shaft. The rollers are movable in an order through the first load path into the turnaround passage and then into the second load path and then into the turnover passage and then back to the first load path. The radial surface of each roller is kept in contact with the first track face and the first contact face when each roller enters the first load path. The radial surface of each roller is kept in contact with the second track face and the second contact face when each roller enters the second load path.

Further the screw nut module comprises a screw nut, at least one turnaround member and a turnover member, wherein the turnover passage is defined in the turnover member; the turnaround passage is defined in the at least one turnaround member; the axial hole is defined in the screw nut.

Further, the screw nut comprises an outside wall defining an external surface, and two mounting holes, a through hole and a plurality of locating holes located on the external surface. The mounting holes and the through hole are disposed in communication with the axial hole. The turnaround member is inverse U-shaped and inserted with two distal ends thereof into the mounting holes respectively. The turnover member is accommodated in the through hole.

Further, the screw nut module comprises a locating member capped on the turnaround member. The locating member comprises a locating groove adapted to accommodate the turnaround member and to hold the turnaround member in place.

In one embodiment of the present invention, the through hole of the screw nut comprises a plurality of bearing portions extending toward the axial hole; the turnover member is inserted into the axial hole and then set in the through hole of the screw nut, comprising a plurality of abutment portions respectively abutted against bearing portion of the screw nut.

In another embodiment of the present invention, the through hole of the screw nut comprises a plurality of bearing portions extending toward the external surface of the screw nut and a locating hole located on each bearing portion; the turnover member is inserted into the axial hole and then set in the through hole of the screw nut, comprising a plurality of abutment portions respectively abutted against bearing portion of the screw nut and a through hole located on each abutment portion and respectively affixed to the locating holes on the bearing portions of the screw nut by a respective screw.

DETAILED DESCRIPTION OF THE INVENTION

Figure 1:
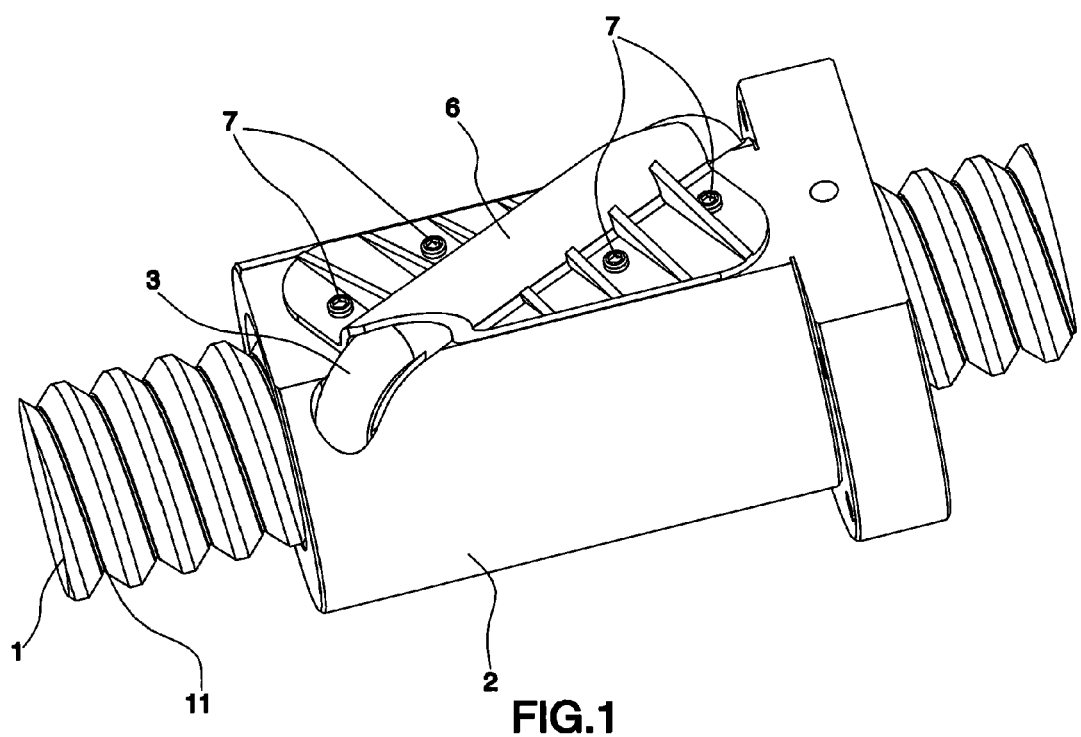
FIG. 1 is an elevational view of a roller screw in accordance with a first embodiment of the present invention.
Figure 2:
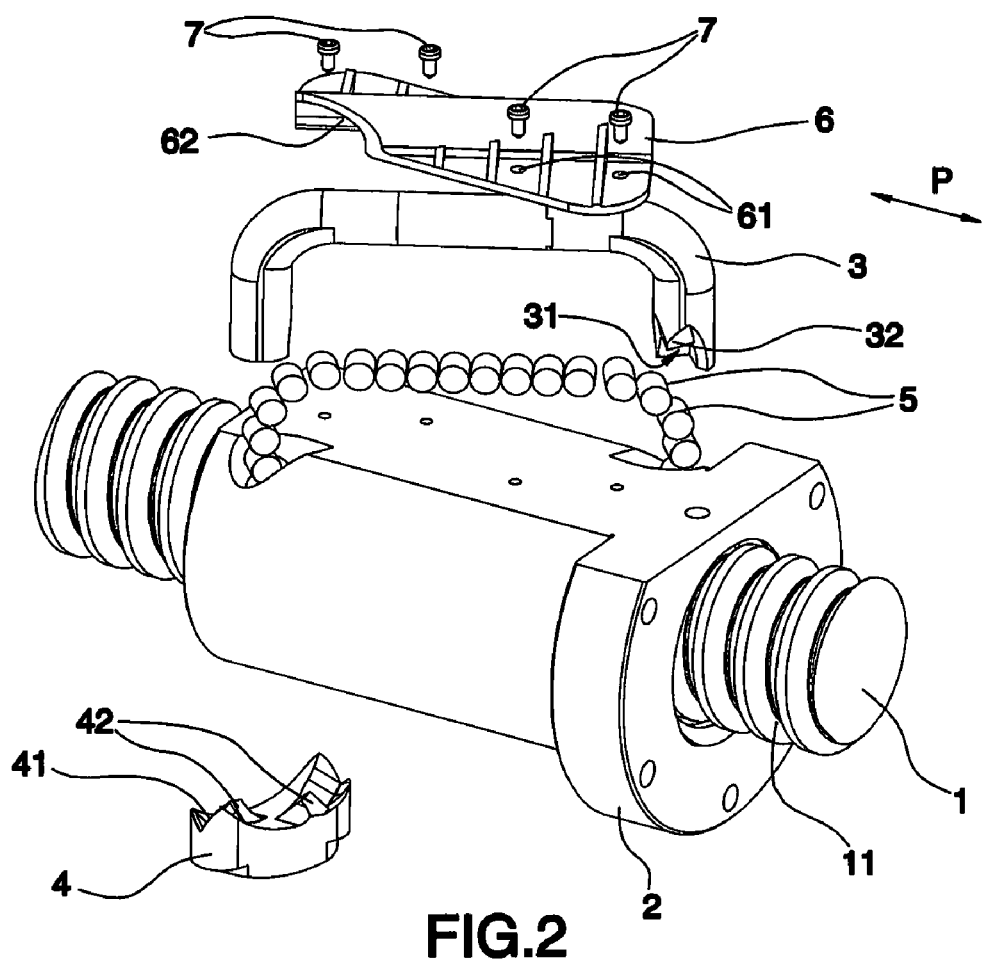
FIG. 2 is an exploded view of the roller screw in accordance with the first embodiment of the present invention.

Referring to FIGS. 1-10, a screw roller in accordance with a first embodiment of the present invention is shown comprising a long shaft 1 and a screw nut module.

The long shaft 1 is shaped like a long bar, comprising a cylindrical peripheral surface 12 and a V-channel 11 spirally extending around the cylindrical peripheral surface 12. The V-channel 11 comprises two opposing sidewalls defining a first track face 111 and a second track face 112 and a 90° contained angle between the first track face 111 and the second track face 112.

The aforesaid screw nut module comprises a screw nut 2, a turnaround member 3, a turnover member 4 and a locating member 6.

The screw nut 2 comprises an axial hole 21 for the passing of the long shaft 1, the wall of the axial hole 21 defining an internal surface 25, and a V-groove 211 spirally extending around the internal surface 25 corresponding to the V-channel 11 of the long shaft 1. The V-groove 211 comprises two opposing sidewalls defining a first contact face 2111 and a second contact face 2112 and a 90° contained angle between the first contact face 2111 and the second contact face 2112. The V-channel 11 and the V-groove 211 constitute a load path 90. The screw nut 2 further comprises an outside wall defining an external surface 26, and two mounting holes 22, a through hole 23 and a plurality of locating holes 24 located on the external surface 26. The mounting holes 22 and the through hole 23 are disposed in communication with the axial hole 21. Further, the mounting holes 22 and the through hole 23 interrupt the V-groove 211. The through hole 23 comprises a plurality of bearing portions 231 extending toward the axial hole 21.

The turnaround member 3 is inverse U-shaped and inserted with its two distal ends into the mounting holes 22 respectively. Further, the turnaround member 3 comprises a turnaround passage 31 and two guide tips 32 respectively protruded from the two distal ends thereof toward the V-channel 11.

The locating member 6 comprises a locating groove 62 and a plurality of through holes 61. The locating groove 62 is adapted to accommodate the turnaround member 3. Further, screws 7 are respectively inserted through the through holes 61 and threaded into the locating holes 24 to affix the locating member 6 to the screw nut 2, thereby holding down the turnaround member 3 in position.

The turnover member 4 is accommodated in the through hole 23 of the screw nut 2, comprising a plurality of abutment portions 43. During installation of the turnover member 4, insert the turnover member 4 into the axial hole 21 and then set the turnover member 4 in the through hole 23 to abut the abutment portions 43 against the bearing portions 231, avoiding escape of the turnover member 4 from the screw nut 2 in direction toward the external surface 26. The turnover member 4 further comprises a turnover passage 41 that divides the load path 90 into a first load path 901 and a second load path 902. The first load path 901 and the second load path 902 each have one end respectively connected to one end of the turnover passage 41.

Figure 10:
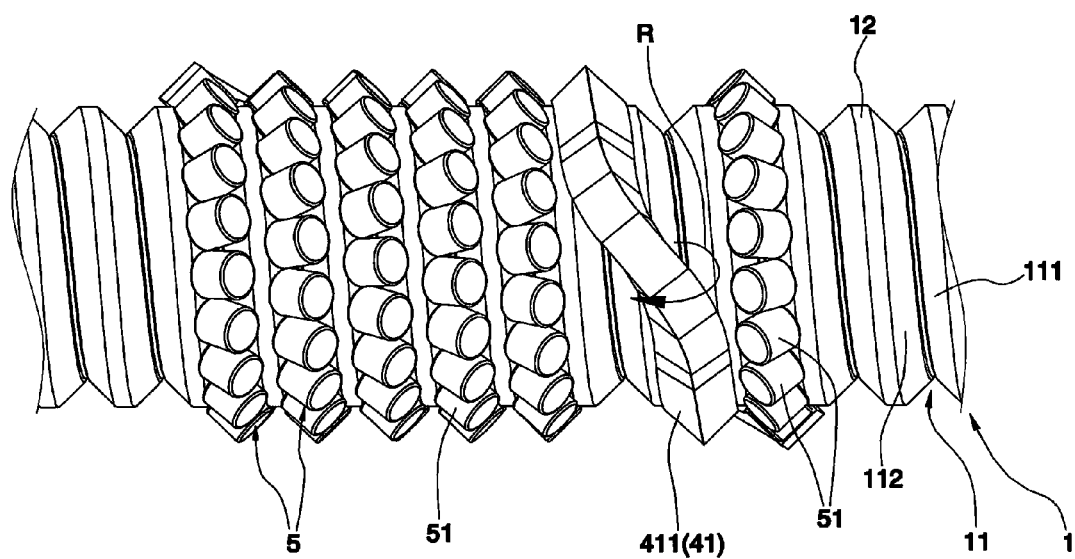
FIG. 10 is an elevational view of the roller screw in accordance with the first embodiment of the present invention after removal of the screw nut and the turnover member, illustrating the path of the turnover passage of the turnover member.
Figure 12:
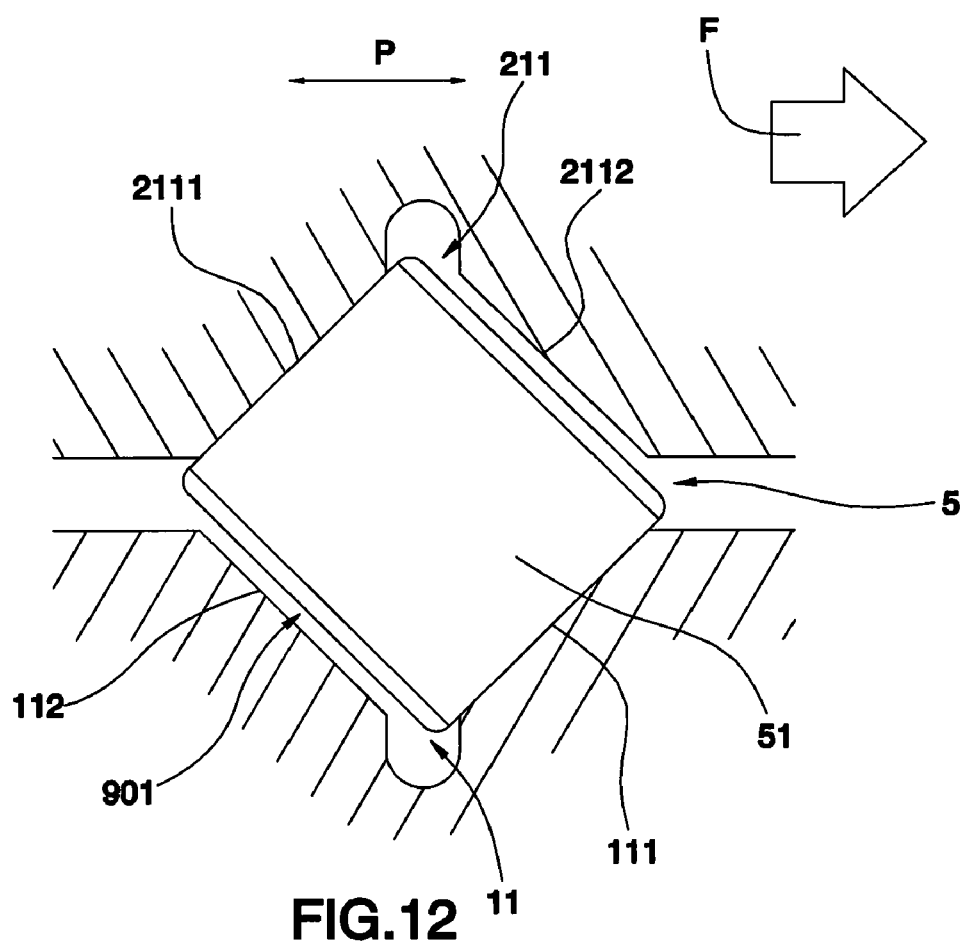
FIG. 12 explains the load bearing direction of the rollers in the load path of the roller screw in accordance with the first embodiment of the present invention.

Further, the turnover passage 41 extends over the cylindrical peripheral surface 12 (see FIG. 10). The other ends of the first load path 901 and second load path 902 are respectively connected to the two distal ends of the turnaround passage 31, forming a complete circulation path (as shown in FIG. 12, the circulation path is formed of the first load path 901, the second load path 902, the turnaround passage 31 and the turnover passage 41).

Referring to FIG. 3, FIG. 6 and FIGS. 8-10, a plurality of rollers 5 are accommodated in the aforesaid circulation path. Each roller 5 comprises a radial surface 51 in a cylindrical shape. The rollers 5 go properly through the first load path 901 into the turnaround passage 31, and then go out of the other end of the turnaround passage 31 into the second load path 902, and then go out of the second load path 902 into the turnover passage 41, and then go out of the other end of the turnover passage 41 back to the first load path 901. When each roller 5 enters the first load path 901, the radial surface 51 is kept in contact with the first track face 111 and the first contact face 2111. When each roller 5 enters the second load path 902, the radial surface 51 is kept in contact with the second track face 112 and the second contact face 2112. Further, to facilitate moving of the rollers 5 into or out of the turnaround passage 31 and the turnover passage 41, the turnaround member 3 is made having the two guide strips 32 respectively extended from each of the two distal ends thereof at two opposite lateral sides of the turnaround passage 31, and the turnover member 4 is made having two pairs of guide strips 42 respectively extended from the two distal ends thereof at two opposite lateral sides of the turnover passage 41. The guide strips 42 and 32 can guide the rollers 5 into and out of the turnaround passage 31 and the turnover passage 41 smoothly.

The importance and effect of the turnover member 4 are explained hereinafter with reference to the related drawings.

At first, please refer to FIG. 3, FIG. 6, FIGS. 8-10 and FIG. 12. The path 311 of the turnaround passage 31 is not a detour path (see FIGS. 8 and 9). The turnaround passage 31 is a tangent design subject to the lead angle of the load passage 90, facilitating smooth connection between one end of the first load path 901/second load path 902 and the turnaround passage 31 and avoiding impact between the rollers 5 and the turnaround member 3. Thus, the rollers 5 can pass through the turnaround passage 31 smoothly without turnover, achieving the best rolling mode. Simply by means of the turnaround member 3, the roller screw cannot work smoothly and will cause floating of the load at the two sides relative to the axial direction of the roller screw. Why does the load float? For easy understanding, please refer to FIG. 12 (that assumes the roller 5 is in the first load path 901). When the roller 5 is in the first load path 901, the radial surface 51 is kept in contact with the radial surface 51 is kept in contact with the first track face 111 and the first contact face 2111. At this time, only the contact direction has a load carrying capacity. Thus, the roller screw bears a load F at the right side in the axial direction P, and receives no load at the left side in the axial direction P. Therefore, the load carrying capacity of the roller screw is determined subject to the contact direction between the radial surface 51 of the roller 5 and the V-channel 11 and V-groove 211. If the turnover member 4 is eliminated, the amount ratio of rollers 5 that are arranged in two different directions will not be constant, causing floating of the load at two sides in the axial direction of the roller screw. A roller screw of this kind is not practical for industrial application.

Figure 8:
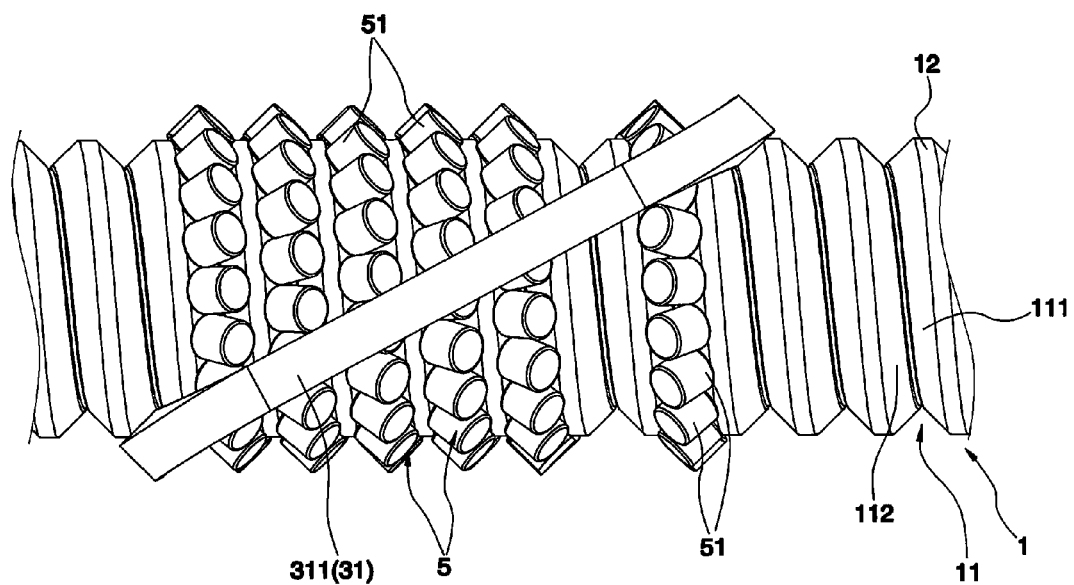
FIG. 8 is an elevational view of the roller screw in accordance with the first embodiment of the present invention after removal of the screw nut and the turnaround member, illustrating the path of the turnaround passage.
Figure 9:
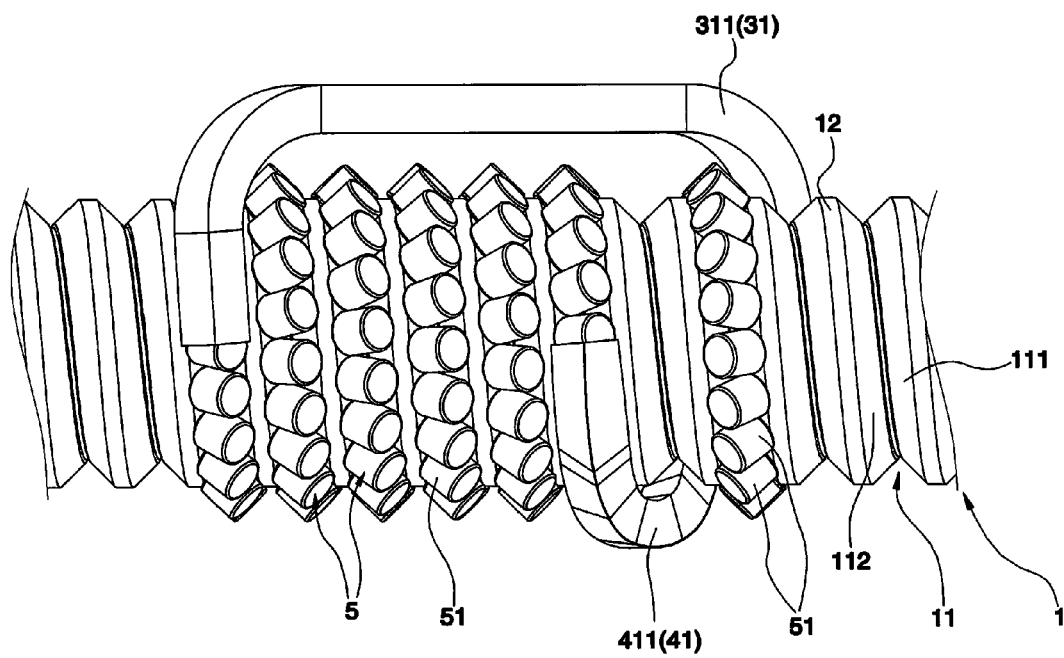
FIG. 9 is an elevational view of the roller screw in accordance with the first embodiment of the present invention after removal of the screw nut, the turnaround member and the turnover member, illustrating the path of the turnaround passage of the turnaround member and the path of the turnover passage of the turnover member.

Referring to FIGS. 8 and 9, subject to the use of the turnover member 4, the amount ratio of rollers 5 that are arranged in two different directions is kept constant. Because the path 411 of the turnover passage 41 of the turnover member 4 turns in one direction R (as illustrated, the angle of cross section of the path 411 of the turnover passage 41 changes gradually in a certain distance), the rollers 5 will turn over through a certain angle when passing through the turnover passage 41, keeping the amount ratio of rollers 5 in two different directions to be constant, i.e. the rollers in the first load path 901 are arranged in one same direction and the rollers in the second load path 902 are arranged in one same direction. Further, the design of the turnover passage 41 has considered the factor that the longer the no-load path (the turnaround passage 31 and the turnover passage 41) is, the lower the smoothness of the circulation of the rollers 5 in the circulation path will be. When the rollers 5 are in the non-load path, the rollers 5 in the load path 90 are in charge of propelling the rollers 5 in the no-load path so that the rollers 5 in the non-load path can move smoothly forwards. If the length of the no-load path is made relatively longer, the amount of the rollers 5 will be relatively increased, and much force will be necessary to propel the rollers 5 in the no-load path, causing circulation instability. Subject to the characteristic of the short turnover passage 41 of the turnover member 4, a less amount of rollers 5 is accommodatable in the turnover passage 41, and therefore the rollers 5 in the load path 90 can propel the rollers 5 in the turnover passage 41 smoothly.

Figure 3:
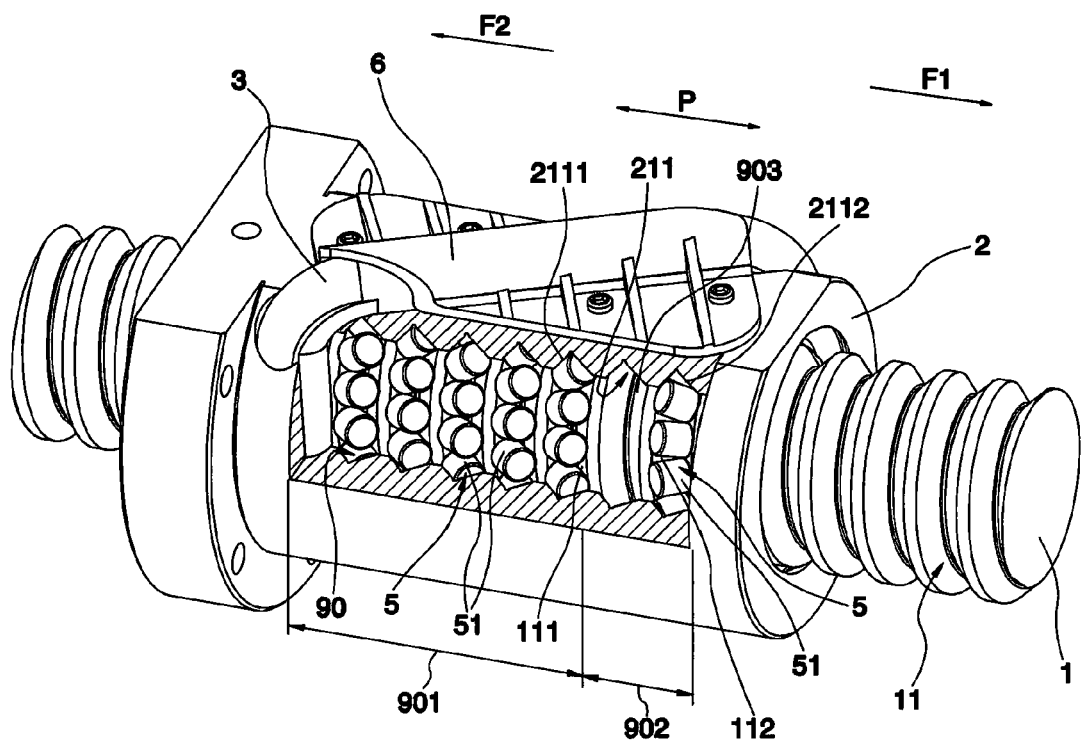
FIG. 3 is an elevational view, partially cutaway, of the roller screw in accordance with the first embodiment of the present invention.
Figure 4:
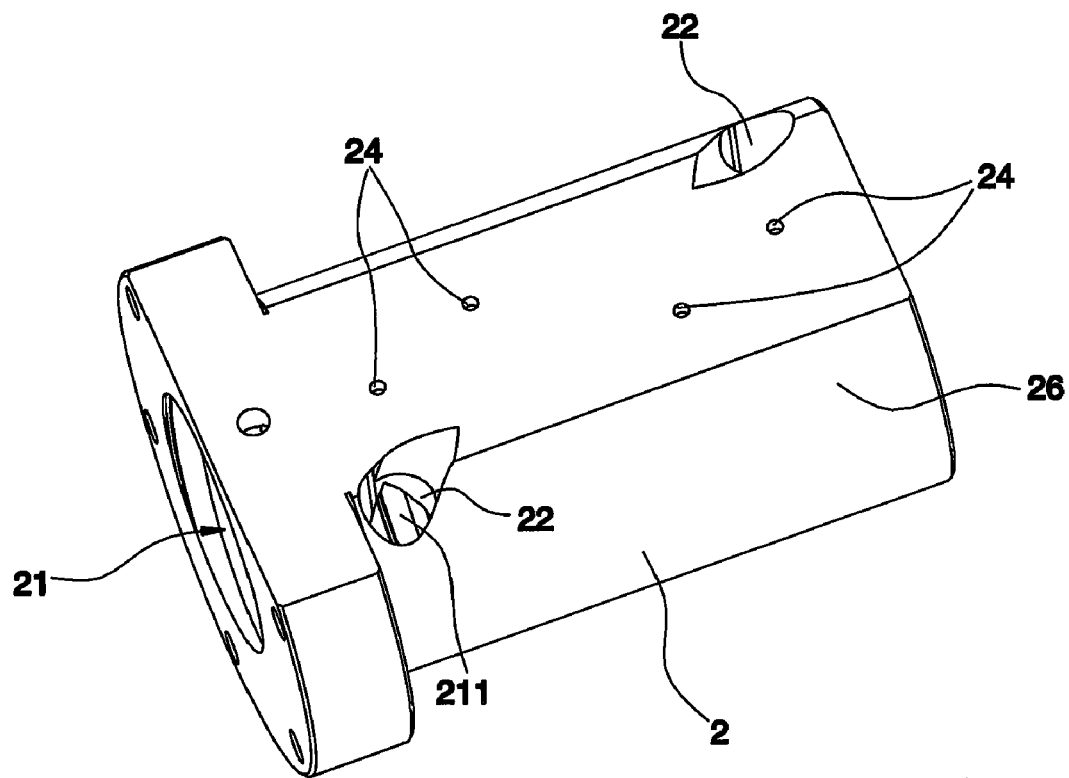
FIG. 4 is an elevational view of the screw nut of the roller screw in accordance with the first embodiment of the present invention.
Figure 5:
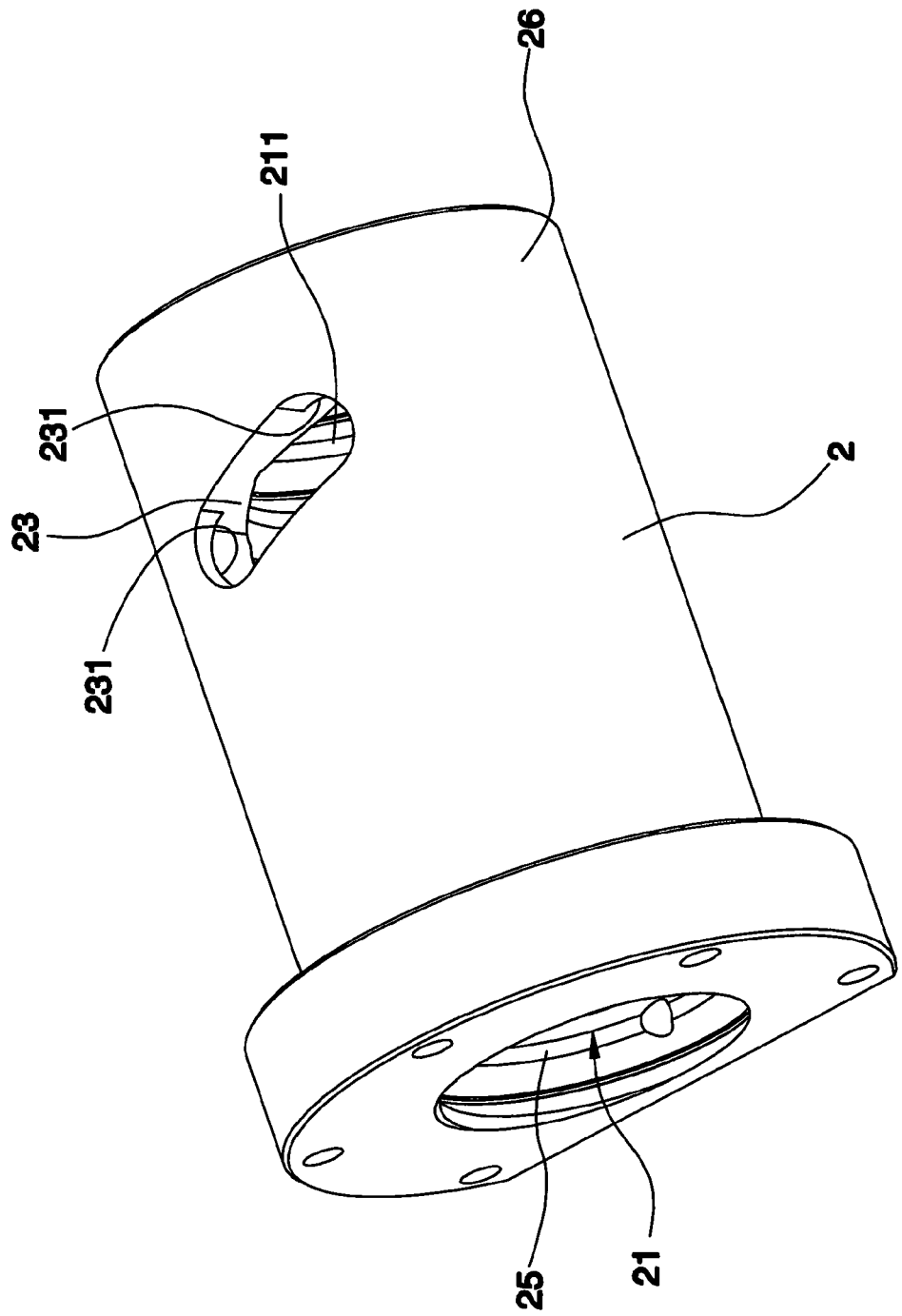
FIG. 5 is another elevational view of the screw nut of the roller screw in accordance with the first embodiment of the present invention when viewed from another angle.
Figure 6:
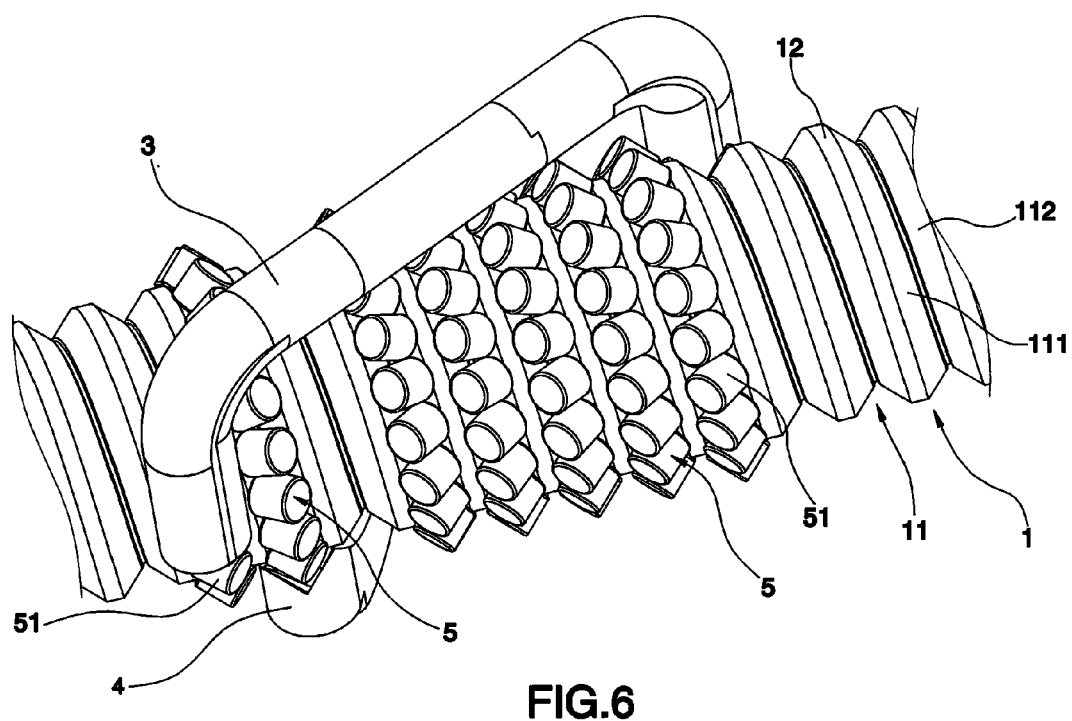
FIG. 6 is an elevational view of the roller screw in accordance with the first embodiment of the present invention after removal of the screw nut.
Figure 7:
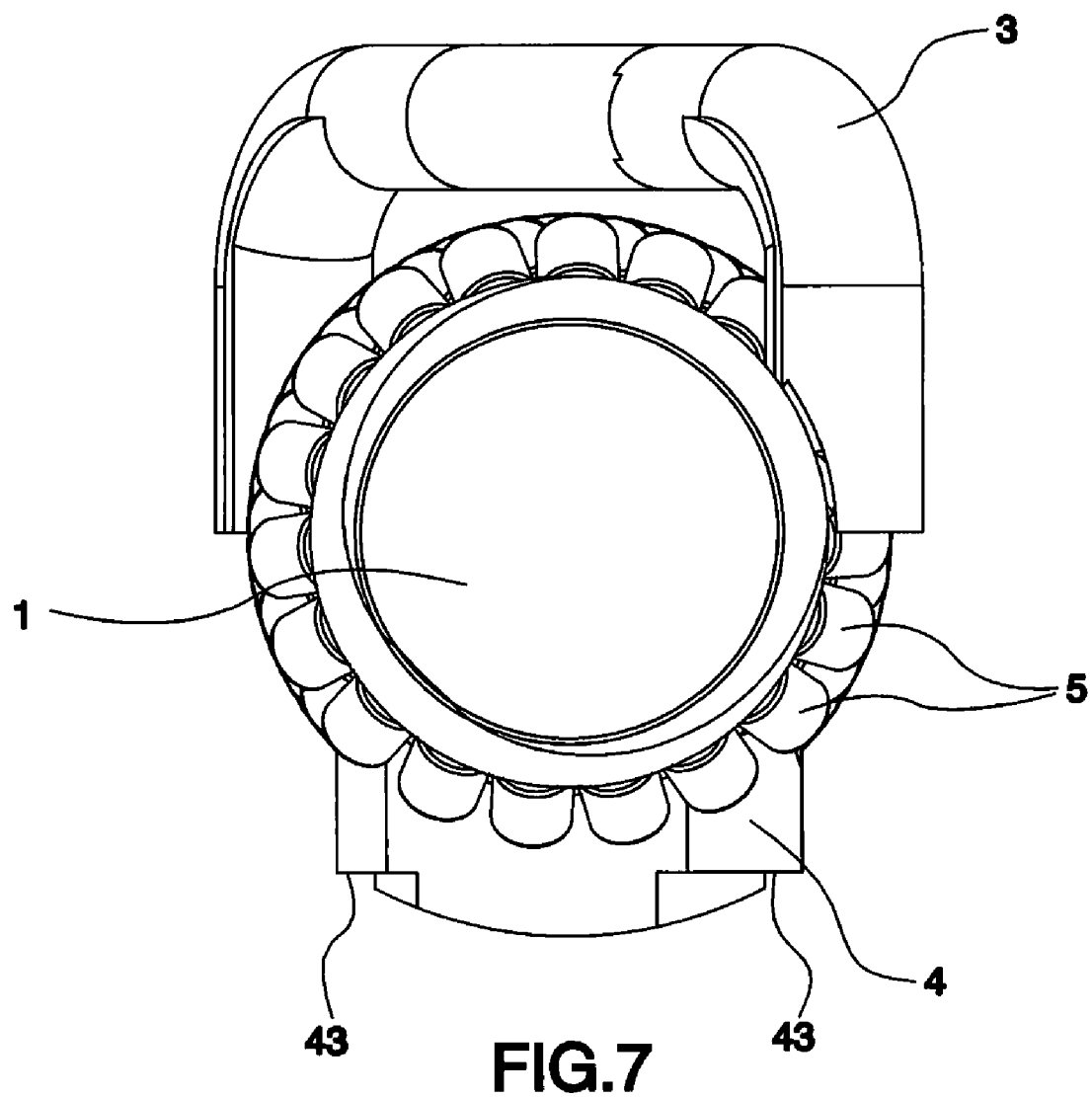
FIG. 7 is an end view of the roller screw in accordance with the first embodiment of the present invention after removal of the screw nut.
Figure 11:
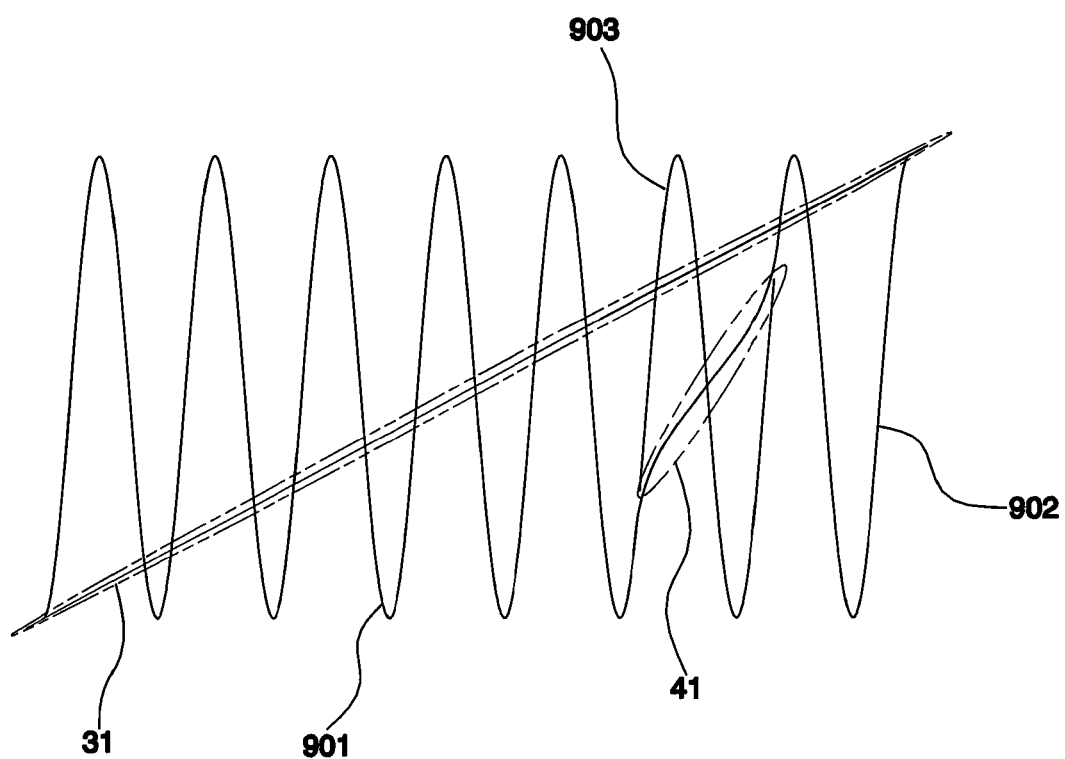
FIG. 11 is a schematic drawing illustrating the roller circulation path of the roller screw in accordance with the first embodiment of the present invention.

Further, as shown in FIG. 3 and FIG. 11, a non-roller region is defined in between the first load path 901 and the second load path 902 subject to the design of the turnover member 4. This non-roller region is defined as a no-load region 903. A lubricating device (not shown) can be arranged in the no-load region 903 to lubricate the load path 90 directly, enabling the rollers 5 to be fully lubricated to enhance the performance. Alternatively, a cooling device (not shown) can be arranged in the no-load region 903 to carry away waste heat that is produced due to friction between the load path 90 and the rollers 5. Subject to the arrangement of the lubricating device or cooling device, the lifespan of the roller screw is prolonged. Further, the turnover member 4 has a function of adjusting the load at the left and right sides in the axial direction P. Subject to the arrangement of the turnover member 4, the load path 90 is divided into a first load path 901 and a second load path 902. Further, the rollers 5 in the first load path 901 and the rollers 5 in the second load path 902 are arranged in different directions. In FIG. 3, F1 represents the load bearable by the rollers in the first load path; F2 represents the load bearable by the rollers in the second load path. Because the number of rollers accommodated in the first load path is greater than the number of rollers accommodated in the second load path, the load F1 is greater than the load F2. Thus, this design of roller screw can be used in an equipment that has different load carrying capacities at the left and right sides in the axial direction (such as all-electric injection molding machine, high-speed punch press, mold-clamping toggle mechanism, mold fixer, ... etc.). The invention allows adjustment of the load at the left and right sides in the axial direction P subject to facility requirements. For example, for use in a facility that requires equal load carrying capacity at the left and right sides in the axial direction P, the location of the turnover member 4 is predetermined to have the number of rollers accommodatable in the first load path be equal to the number of rollers accommodatable in the second load path. Subject to this arrangement, the load carrying capacity at the left and right sides in the axial direction P becomes equal. Thus, the design of the present invention fits different industrial requirements, i.e., the invention enhances the generalization of the roller screw. Further, the turnaround member and turnover member of the present invention can be made by means of injection molding. Therefore, the invention facilitates mass production. Further, the processing of the screw nut can be done by means of numerical-control machining, i.e., the invention has a high-volume production characteristic.

Figure 13:
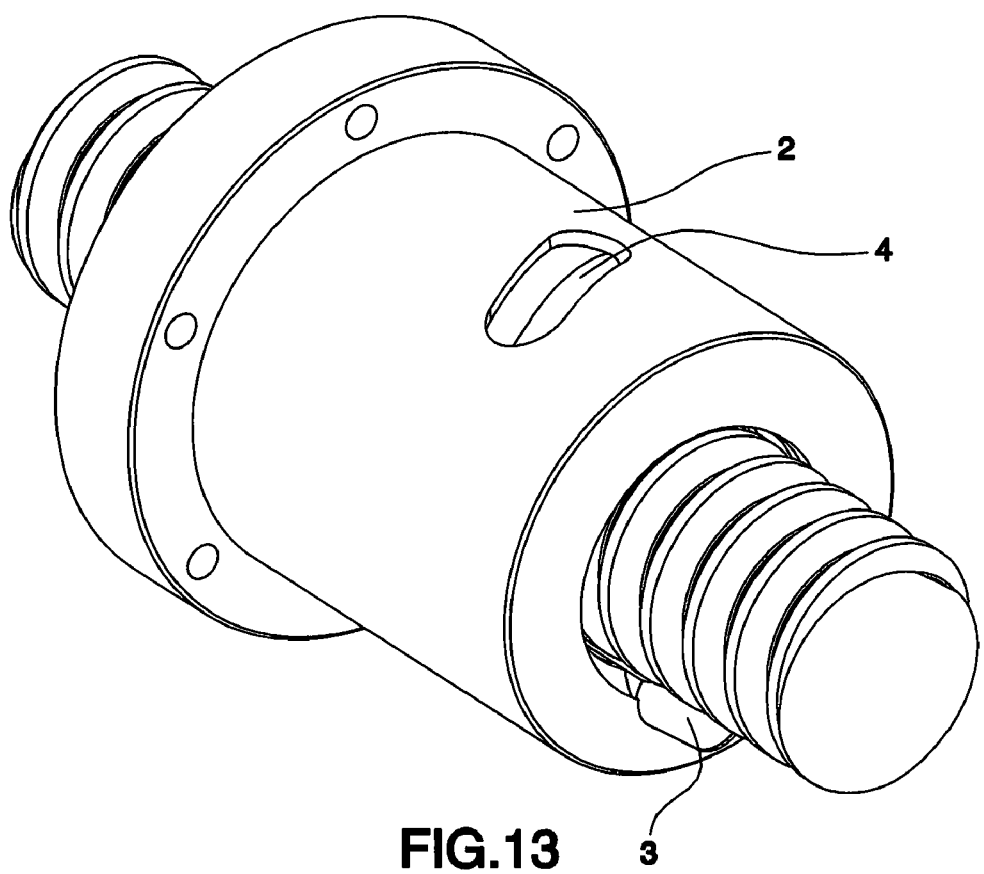
FIG. 13 is an elevational view of a roller screw in accordance with a second embodiment of the present invention.
Figure 14:
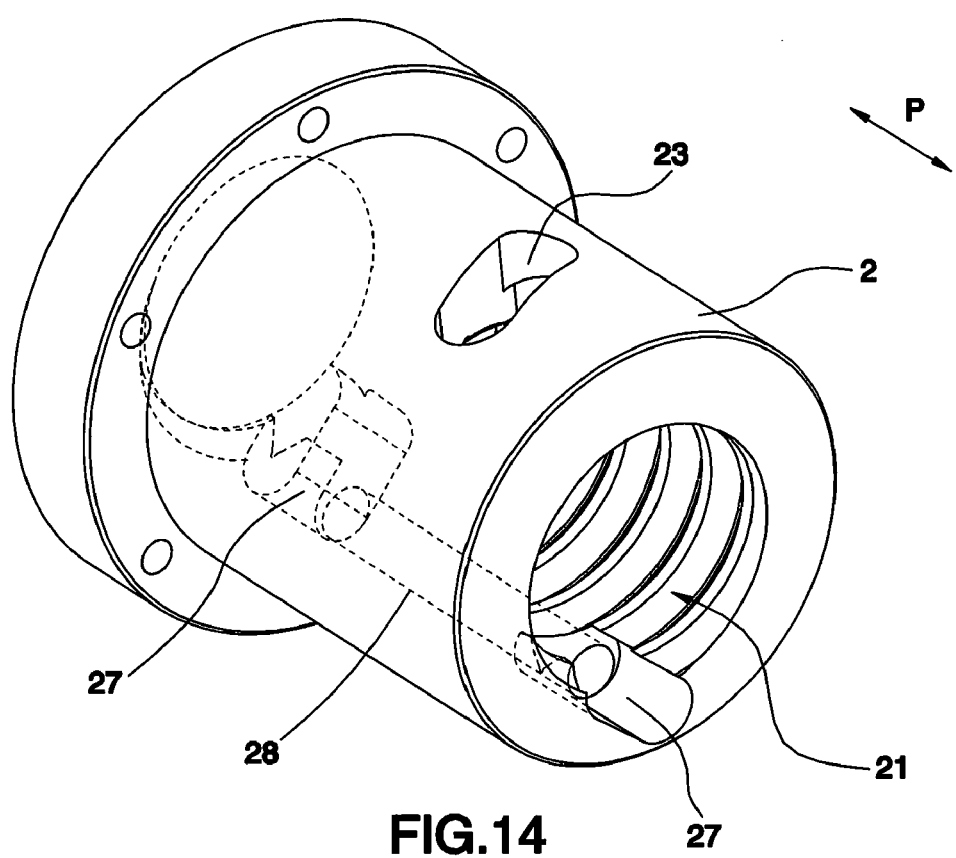
FIG. 14 is a perspective view of the screw nut of the roller screw in accordance with the second embodiment of the present invention.

FIGS. 13 and 14 illustrate a roller screw in accordance with a second embodiment of the present invention. This second embodiment is substantially similar to the aforesaid first embodiment with the exception of the relationship of arrangement between the turnaround member 3 and the screw nut 2. According to this second embodiment, the screw nut 2 comprises a turnaround hole 28 extending through the two distal ends thereof in the axial direction P, and two accommodation grooves 27 on the internal surface 25 in the axial hole 21. The accommodating grooves 27 are respectively disposed at the two distal ends of the turnaround hole 28 for accommodating one respective turnaround member 3, wherein the turnaround passage (not shown) of one turnaround member 3 has its two distal ends respectively connected to the turnaround hole 28 and one end of the first load path; the turnaround passage (not shown) of the turnaround member 3 has its two distal ends respectively connected to the turnaround hole 28 and one end of the second load path; the turnover member 4 is accommodated in the through hole 23 of the screw nut 2 in the same manner as the aforesaid first embodiment; the two distal ends of the turnover passage are respectively connected to the other end of the first load path and the other end of the second load path to constitute a complete circulation path. The other parts of the structure, configuration and effect of this second embodiment are same as the aforesaid first embodiment.

Figure 15:
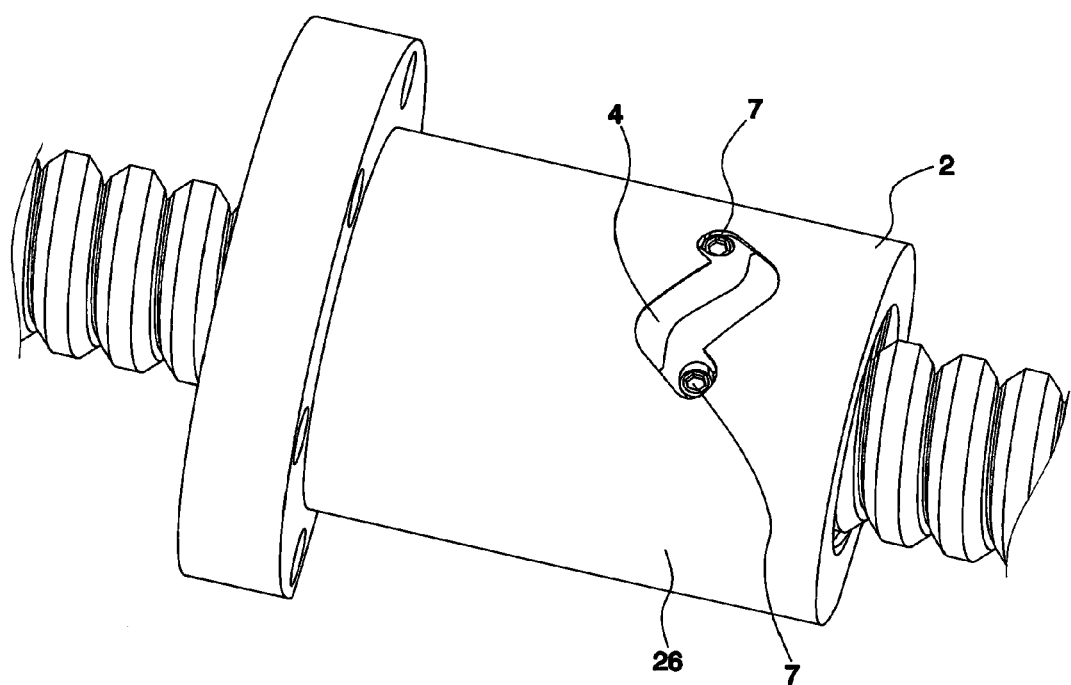
FIG. 15 is an elevational view of a roller screw in accordance with a third embodiment of the present invention.
Figure 16:
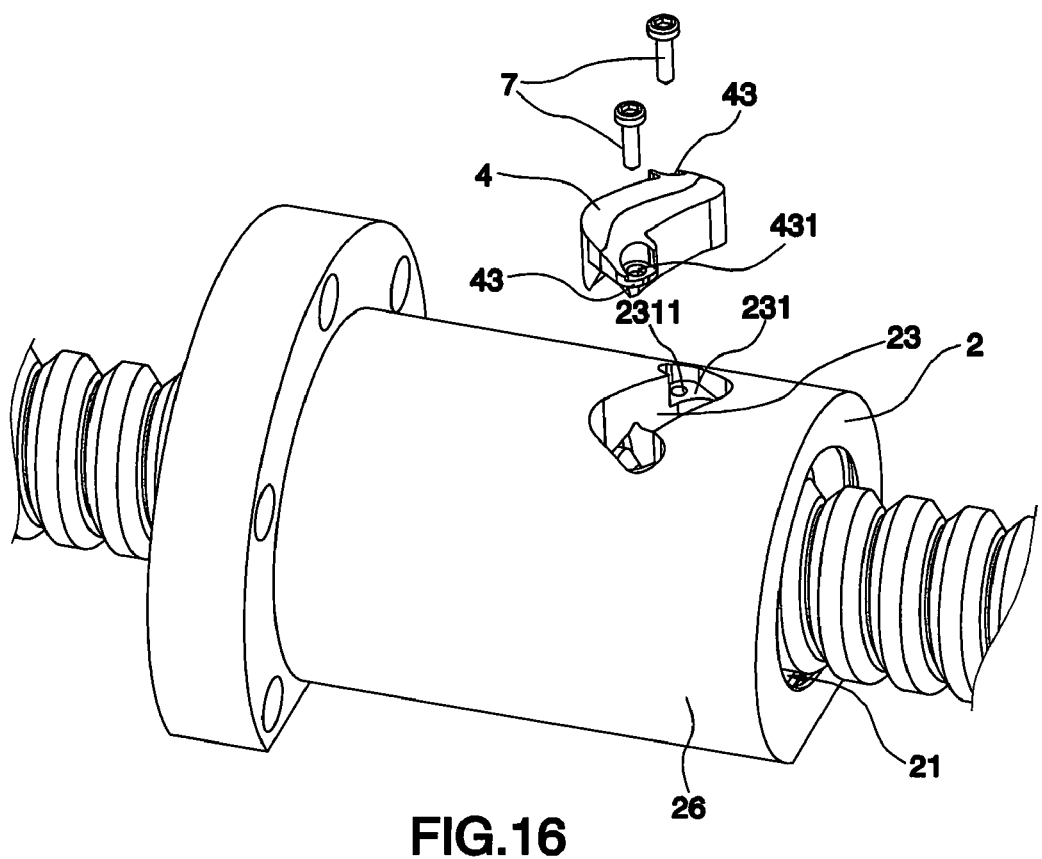
FIG. 16 is an exploded view of the roller screw in accordance with the third embodiment of the present invention.
Figure 17:
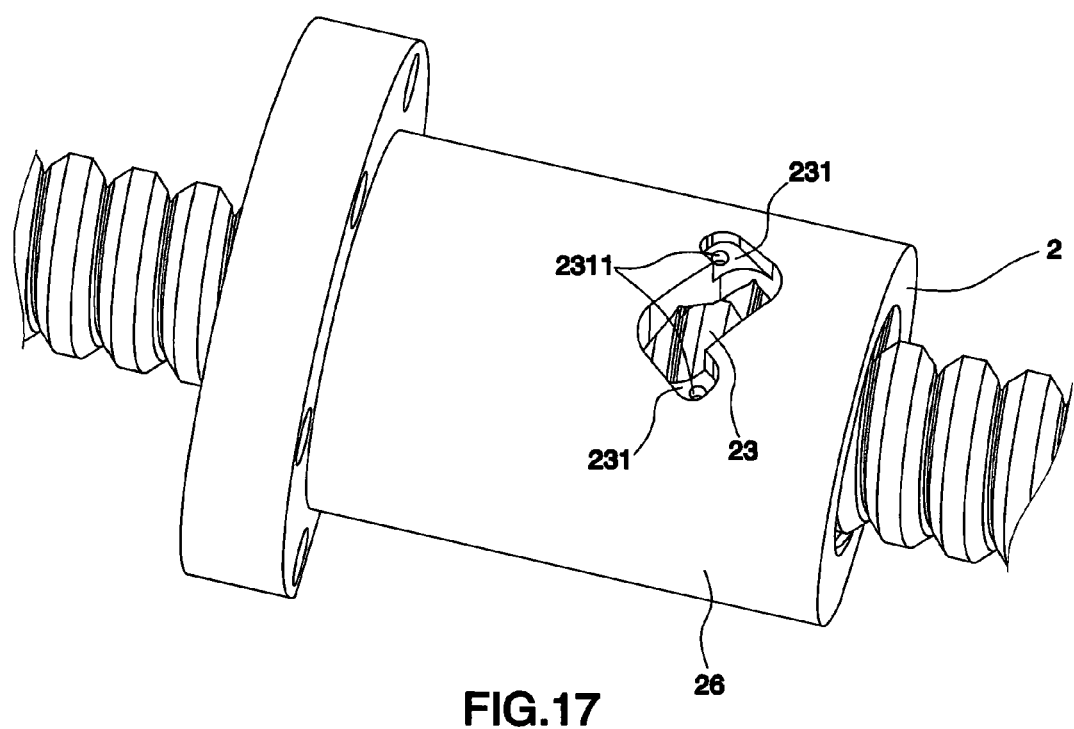
FIG. 17 is an elevational assembly view of the long shaft and the screw nut of the roller screw in accordance with the third embodiment of the present invention.

FIGS. 15~17 illustrate a roller screw in accordance with a third embodiment of the present invention. This third embodiment is substantially similar to the aforesaid first embodiment with the exception that the arrangement of the turnover member 4. According to this third embodiment, the turnover member 4 is inserted from the external surface 26 of the screw nut 2 into the through hole 23; the bearing portions 231 of the through hole 23 extend toward the external surface 26; each bearing portion 231 has a locating hole 2311; the turnover member 4 comprises abutment portions 43 respectively abutted against the bearing portions 231, and a through hole 431 cut through each abutment portion 43; screws 7 are respectively inserted through the through holes 431 and threaded into the locating holes 2311 to affix the turnover member 4 to the screw nut 2. According to this embodiment, the number of the through holes 431, the number of the locating holes 2311 and the number of the screws 7 are 2. The other parts of the structure, configuration and effect of this third embodiment are same as the aforesaid first embodiment.

In conclusion, it is no doubt that the invention satisfies the basic criteria of industrial applicability, novelty and inventiveness. Prior to applying for patent, the technical features of the invention have not been published or put to public use thereby rendering the invention possible for limitation by others.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A roller screw, comprising:
   a plurality of rollers, each said roller comprising a radial surface in a cylindrical shape;
   a long shaft shaped like a long bar, said long shaft comprising a cylindrical peripheral surface and a V-channel spirally extending around said cylindrical peripheral surface, said V-channel comprising two opposing sidewalls defining a first track face and a second track face and a contained angle between said first track face and said second track face which substantially equal to 90°;
   a screw nut module, said screw nut module comprising a turnover passage, a turnaround passage and an axial hole for the passing of said long shaft, an internal surface surrounding said axial hole and a V-groove spirally extending around said internal surface corresponding to said V-channel of said long shaft, said V-groove comprising two opposing sidewalls defining a first contact face and a second contact face and a contained angle between said first contact face and said second contact face which substantially equal to 90°;
   wherein said V-channel and said V-groove constitute a load path for accommodating said rollers; said turnover passage divides said load path into a first load path and a second load path, said first load path and said second load path each having one end thereof respectively connected to one end of said turnover passage and an opposite end thereof respectively connected to two distal ends of said turnaround passage; said turnover passage extends over the cylindrical peripheral surface of said long shaft;
   wherein said rollers are movable in an order through said first load path into said turnaround passage and then into said second load path and then into said turnover passage and then back to said first load path;
   wherein the radial surface of each said roller is kept in contact with said first track face and said first contact face when each said roller enters said first load path; the radial surface of each said roller is kept in contact with said second track face and said second contact face when each said roller enters said second load path.

2. The roller screw as claimed in claim 1, wherein said screw nut module comprises a screw nut, at least one turnaround member and a turnover member, wherein said turnover passage is defined in said turnover member; said turnaround passage is defined in said at least one turnaround member; said axial hole is defined in said screw nut.

3. The roller screw as claimed in claim 2, wherein said screw nut comprises an outside wall defining an external surface, and two mounting holes, a through hole and a plurality of locating holes located on said external surface, said mounting holes and said through hole being disposed in communication with said axial hole; said turnaround member is inverse U-shaped and inserted with two distal ends thereof into said mounting holes respectively; said turnover member is accommodated in said through hole.

4. The roller screw as claimed in claim 3, wherein said screw nut module further comprises a locating member capped on said turnaround member, said locating member comprising a locating groove adapted to accommodate said turnaround member and to hold said turnaround member in place.

5. The roller screw as claimed in claim 3, wherein said through hole of said screw nut comprises a plurality of bearing portions extending toward said axial hole; said turnover member is inserted into said axial hole and then set in said through hole of said screw nut, comprising a plurality of abutment portions respectively abutted against bearing portion of said screw nut.

6. The roller screw as claimed in claim 3, wherein said through hole of said screw nut comprises a plurality of bearing portions extending toward the external surface of said screw nut and a locating hole located on each said bearing portion; said turnover member is inserted into said axial hole and then set in said through hole of said screw nut, comprising a plurality of abutment portions respectively abutted against bearing portion of said screw nut and a through hole located on each said abutment portion and respectively affixed to the locating holes on said bearing portions of said screw nut by a respective screw.

\* \* \* \* \*